Patented June 20, 1944

2,351,974

UNITED STATES PATENT OFFICE 2,351,974

PRODUCTION OF SILVER PREPARATIONS

Max Kollmar, Frankfort-on-the-Main, Germany; vested in the Alien Property Custodian No Drawing. Application September 24, 1940, Serial No. 358,184. In Germany September 29, 1939

6 Claims. (Cl. 106—1)

My invention relates to the production of silver preparations for surface silvering of refractory or ceramic material, for example, glass, quartz, mica, stone ware, porcelain, magnesium silicate containing fragments or the like. More specifically it relates to the production of silver preparations containing oxides of the rare earths or other base metals, particularly manganese or its compounds.

Surface silvering may also be applied to highly refractory substances such as, for instance, sintered aluminium oxide, or masses containing mainly titanium dioxide, beryllium oxide or zirconium oxide. Thus the silvering may be employed either as decoration or as an electrically conducting surface to be used for electrotechnical purposes, especially in high-frequency practice.

If the usual silver preparations combined with fluxes, solvents and suspension means are applied to the aforementioned substances or objects and subsequently fired, the resulting coatings are very defective, especially when only small quantities of silver have been used on account of economic reasons. These coatings also show poor adherence, reduced electric conductivity and are lacking in appearance. It was therefore indispensable to add a small quantity of a noble metal, for example iridium, to the silver preparations which addition was sufficient to produce well adhesive suitable silver coatings of considerable refractoriness.

In an effort to avoid the addition of the expensive noble metals I have made the observation that excellent effects may be obtained in using silver preparations which contain also metal compounds or metals less noble than silver, the oxides of which have a far higher melting point than the usually employed fluxes. Heavy metals have proved especially suitable, thus, for example, cerium, lanthanium, thorium, uranium tantalum, nickel or the like. According to my invention, manganese exerts the most suitable effects. The aforementioned metals may be employed either per se or in form of their compounds as, for instance, oxides or salts, but especially in form of their organic compounds. It has proved advantageous to use such organic compounds which are sufficiently soluble in the utilized solvents, for example, resinates, acetylacetonates, oleates or the like. All these substances may be employed either alone or in any desired mixture. Of course, an addition of small quantities of iridium may also be provided for, but in general such an addition is not necessary.

If desired, the new silver preparations may contain also some other fluxes, for instance, lead or bismuth compounds. These relatively low melting additions have but an adhesive effect and do not improve the other qualities, such as refractoriness, of the silver coatings.

The amount of my new additions may vary in wide ranges. In general, it is advantageous to keep the addition below 10%, preferably even below 1% of the whole mixture.

*Examples*

(1) 20 grs. finely divided silver powder are mixed with 1 g. basic bismuth nitrate, 4 grs. resinic acid manganese and 75 grs. of a 50% resin solution in oil of turpentine. This preparation is applied to glazed porcelain, dried and fired at 730° C.

A firmly adhesive coating of good conductivity of a beautiful metallic appearance is obtained. If desired, this coating may be polished as usual, in order to increase its metallic brightness. The same excellent results will be obtained by substituting the above mentioned quantity of manganese to one-third for uranium oxide.

(2) The silver preparation was mixed according to Example 1 with the difference only that instead of manganese oxide half the amount of nickel was used. A sheet of mica was covered with this preparation and fired at a temperature of about 600° C. The coatings thus obtained show a very good electric conductivity and may be utilized for the manufacture of, for instance, electric condensers.

(3) Silver preparation, made according to Example 1, but adding the same amount of lanthanum oxide instead of manganese oxide. This preparation was burnt into glass at a temperature of about 500° C. The thus obtained substances may be employed for decorative purposes as well as electric purposes of all kinds.

What I claim is:

1. A preparation for silvering the surfaces of ceramic ware by firing which comprises a flux, a solvent vehicle, silver, and a compound of a heavy metal whose oxide has a melting point higher than that of said flux, said heavy metal being selected from the group which consists of manganese, cerium, lanthanum, thorium, uranium, tantalum, and nickel.

2. A composition as defined in claim 1 wherein the heavy metal compound added comprises less than 10% by weight of said preparation.

3. A composition as defined in claim 1 wherein the heavy metal compound added comprises less than 1% by weight of said preparation.

4. A preparation for silvering the surfaces of ceramic ware by firing which comprises a flux, a solvent vehicle, metallic silver, and an organic compound of manganese soluble in said solvent system.

5. A preparation for silvering the surfaces of ceramic ware by firing which comprises a flux, a solvent vehicle, metallic silver, and a nickel compound.

6. A preparation for silvering the surfaces of ceramic ware by firing which comprises a flux, a solvent vehicle, metallic silver, and lanthanum oxide.

MAX KOLLMAR.